United States Patent
Sugimoto

(10) Patent No.: US 11,159,775 B2
(45) Date of Patent: Oct. 26, 2021

(54) INFORMATION PROCESSING APPARATUS, IMAGING APPARATUS, IMAGING SYSTEM, INFORMATION PROCESSING METHOD, IMAGING METHOD, INFORMATION PROCESSING PROGRAM, AND IMAGING PROGRAM

(71) Applicant: FUJIFILM Corporation, Tokyo (JP)

(72) Inventor: Masahiko Sugimoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/840,473

(22) Filed: Apr. 6, 2020

(65) Prior Publication Data

US 2020/0236333 A1    Jul. 23, 2020

Related U.S. Application Data

(63) Continuation of application No. PCT/JP2018/037700, filed on Oct. 10, 2018.

(30) Foreign Application Priority Data

Oct. 25, 2017    (JP) .............. JP2017-205972

(51) Int. Cl.
*H04N 9/73* (2006.01)
*H04N 5/235* (2006.01)
(Continued)

(52) U.S. Cl.
CPC ............. *H04N 9/73* (2013.01); *H04N 5/2351* (2013.01); *H04N 5/2353* (2013.01); *H04N 5/2355* (2013.01); *H04N 9/646* (2013.01)

(58) Field of Classification Search
CPC ...... H04N 9/73; H04N 5/2351; H04N 5/2353; H04N 5/2355; H04N 9/646
See application file for complete search history.

(56) References Cited

U.S. PATENT DOCUMENTS 8,675,091 B2 * 3/2014 Silverstein ........... H04N 5/2258
 348/223.1
10,122,980 B2 * 11/2018 Nakashima .......... H04N 13/344
(Continued)

FOREIGN PATENT DOCUMENTS

CN    104679876    6/2015
CN    105516507    4/2016
(Continued)

OTHER PUBLICATIONS

"International Search Report (Form PCT/ISA/210) of PCT/JP2018/037700," dated Dec. 18, 2018, with English translation thereof, pp. 1-4.

(Continued)

*Primary Examiner* — Ahmed A Berhan
(74) *Attorney, Agent, or Firm* — JCIPRNET

(57) ABSTRACT

A processing control unit 50 of an information processing apparatus 14 functions as an acquisition unit that acquires positional information representing an imaging position in which imaging is performed, time range information representing an imaging time range in which the imaging is performed, and color temperature information related to the imaging, from each of a plurality of imaging apparatuses 12. In addition, the processing control unit 50 functions as a derivation unit that derives recommended color temperature information recommended in a case of performing imaging in a specific position and a specific time range from information obtained by performing statistical processing on the acquired positional information, the time range information, and the color temperature information.

20 Claims, 12 Drawing Sheets

(51) Int. Cl.
　　　*H04N 5/232*　　　(2006.01)
　　　*H04N 9/64*　　　(2006.01)

(56) References Cited

U.S. PATENT DOCUMENTS

| | | |
|---|---|---|
| 10,229,485 B2 | 3/2019 | Nakamura et al. |
| 2004/0061782 A1 | 4/2004 | Kinjo |
| 2018/0069998 A1 | 3/2018 | Nakata et al. |

FOREIGN PATENT DOCUMENTS

| | | |
|---|---|---|
| CN | 105578027 | 5/2016 |
| CN | 105847413 | 8/2016 |
| CN | 106101536 | 11/2016 |
| CN | 107079110 | 8/2017 |
| JP | 2002112255 | 4/2002 |
| JP | 2004147298 | 5/2004 |
| JP | 2014180024 | 9/2014 |
| JP | 2016167797 | 9/2016 |
| WO | 2016157873 | 10/2016 |
| WO | 2018079043 | 5/2018 |

OTHER PUBLICATIONS

"Written Opinion of the International Searching Authority (Form PCT/ISA/237) of PCT/JP2018/037700," dated Dec. 18, 2018, with English translation thereof, pp. 1-9.
"Office Action of Japan Counterpart Application", dated Feb. 16, 2021, with English translation thereof, p. 1-p. 5.
"Office Action of China Counterpart Application" with English translation thereof, dated Jun. 29, 2021, p. 1-p. 27.

\* cited by examiner

INFORMATION PROCESSING APPARATUS, IMAGING APPARATUS, IMAGING SYSTEM, INFORMATION PROCESSING METHOD, IMAGING METHOD, INFORMATION PROCESSING PROGRAM, AND IMAGING PROGRAM

CROSS-REFERENCE TO RELATED APPLICATIONS

This application is a Continuation of PCT International Application No. PCT/JP2018/037700 filed on Oct. 10, 2018, which claims priority under 35 U.S.C § 119(a) to Japanese Patent Application No. 2017-205972 filed on Oct. 25, 2017. Each of the above application(s) is hereby expressly incorporated by reference, in its entirety, into the present application.

BACKGROUND OF THE INVENTION

1. Field of the Invention

The technology of the present disclosure relates to an information processing apparatus, an imaging apparatus, an imaging system, an information processing method, an imaging method, a non-transitory computer readable recording medium storing an information processing program, and a non-transitory computer readable recording medium storing an imaging program.

2. Description of the Related Art

In the related art, in a case where a subject is imaged, adjustment of a white balance, adjustment of exposure, and the like are performed in an imaging apparatus depending on a set tint such as a color temperature. However, for example, the color temperature of the subject may be significantly different from ambient light, or setting an appropriate tint may be complicated depending on a type and the like of illumination.

Therefore, a technology for setting a tint of a host apparatus in accordance with a tint of another imaging apparatus in a case of performing imaging has been known as a technology for setting the tint. For example, JP2014-180024A discloses a technology for setting, in a host apparatus, a color temperature derived using detection information of another nearby imaging apparatus in which a subject as a factor of hindering derivation of the color temperature is not present within an angle of view, and performing imaging based on the set color temperature. In addition, for example, JP2016-167797A discloses a technology for correcting a color temperature used in imaging by each of a plurality of imaging apparatuses based on a color temperature common to captured images imaged by the imaging apparatuses.

SUMMARY OF THE INVENTION

In the technologies disclosed in JP2014-180024A and JP2016-167797A, the tint is automatically set, but the tint of the host apparatus is simply set in accordance with the tint of the other imaging apparatus. Thus, an appropriate tint may not be set. For example, in a case where the tint of the other imaging apparatus is inappropriate, a tint corresponding to the inappropriate tint is set.

The present disclosure is conceived in view of the above matter. An object of the present disclosure is to provide an information processing apparatus, an imaging apparatus, an imaging system, an information processing method, an imaging method, a non-transitory computer readable recording medium storing an information processing program, and a non-transitory computer readable recording medium storing an imaging program capable of simply setting a more appropriate tint in imaging.

In order to achieve the object, an information processing apparatus of the present disclosure comprises an acquisition unit that acquires imaging position information representing an imaging position in which imaging is performed, imaging time range information representing an imaging time range in which the imaging is performed, and first tint information related to the imaging, from each of a plurality of imaging apparatuses, and a derivation unit that derives second tint information recommended in a case of performing the imaging in a specific position and a specific time range from information obtained by performing statistical processing on the imaging position information, the imaging time range information, and the first tint information acquired by the acquisition unit.

In the information processing apparatus of the present disclosure, the acquisition unit may acquire tint information after correction of a white balance as the first tint information from the imaging apparatus that corrects the white balance among the plurality of imaging apparatuses, and the derivation unit may perform the statistical processing by increasing a weight of the first tint information which is the tint information after correction of the white balance to be higher than the weight of another first tint information.

In the information processing apparatus of the present disclosure, the acquisition unit may acquire two types of tint information including tint information before correction of a white balance and tint information after correction of the white balance as the first tint information from the imaging apparatus that corrects the white balance among the plurality of imaging apparatuses, and the derivation unit may perform the statistical processing by increasing a weight of the first tint information which is the tint information after correction of the white balance to be higher than the weight of the first tint information which is the tint information before correction of the white balance.

In the information processing apparatus of the present disclosure, an image before correction of the white balance may be an image in which the white balance is adjusted based on the second tint information.

In the information processing apparatus of the present disclosure, the derivation unit may further include a transmission unit that transmits the second tint information to the imaging apparatuses performing the imaging in the specific position and the specific time range.

In the information processing apparatus of the present disclosure, the acquisition unit may further acquire specific positional information representing the specific position and specific time range information representing the specific time range from the imaging apparatuses, and the information processing apparatus may further comprise a transmission unit that transmits the second tint information derived by the derivation unit to the imaging apparatuses from which the specific positional information and the specific time range information are acquired.

In the information processing apparatus of the present disclosure, the statistical processing may be processing of deriving information representing a frequency of the first tint information for each imaging position represented by the imaging position information and each imaging time range represented by the imaging time range information.

In order to achieve the object, an imaging apparatus of the present disclosure comprises an output unit that, in a case where a subject is imaged, outputs imaging position information representing an imaging position in which the subject is imaged, imaging time range information representing an imaging time range in which the imaging is performed, and first tint information related to the imaging, and in a case where the subject is to be imaged, outputs specific positional information representing a specific position in which imaging is to be performed, and specific time range information representing a specific time range in which the imaging is to be performed, an acquisition unit that acquires second tint information which is derived by an information processing apparatus from information obtained by performing statistical processing on the imaging position information, the imaging time range information, and the first tint information and which is recommended in a case of performing the imaging in the specific position and the specific imaging time range, and an imaging portion that performs the imaging using the second tint information acquired by the acquisition unit.

In order to achieve the object, an imaging system of the present disclosure comprises the information processing apparatus of the present disclosure, and the imaging apparatus of the present disclosure.

In order to achieve the object, an information processing method of the present disclosure comprises acquiring imaging position information representing an imaging position in which imaging is performed, imaging time range information representing an imaging time range in which the imaging is performed, and first tint information related to the imaging, from each of a plurality of imaging apparatuses, and deriving second tint information recommended in a case of performing the imaging in a specific position and a specific time range from information obtained by performing statistical processing on the acquired imaging position information, the acquired imaging time range information, and the acquired first tint information.

In order to achieve the object, an imaging method of the present disclosure comprises, in a case where a subject is imaged, outputting imaging position information representing an imaging position in which the subject is imaged, imaging time range information representing an imaging time range in which the imaging is performed, and first tint information related to the imaging, in a case where the subject is to be imaged, outputting specific positional information representing a specific position in which imaging is to be performed, and specific time range information representing a specific time range in which the imaging is to be performed, acquiring second tint information which is derived by an information processing apparatus from information obtained by performing statistical processing on the imaging position information, the imaging time range information, and the first tint information and which is recommended in a case of performing the imaging in the specific position and the specific imaging time range, and performing the imaging by an imaging portion using the acquired second tint information.

In order to achieve the object, a non-transitory computer readable recording medium storing an information processing program of the present disclosure causes a computer to execute a process comprising acquiring imaging position information representing an imaging position in which imaging is performed, imaging time range information representing an imaging time range in which the imaging is performed, and first tint information related to the imaging, from each of a plurality of imaging apparatuses, and deriving second tint information recommended in a case of performing the imaging in a specific position and a specific time range from information obtained by performing statistical processing on the acquired imaging position information, the acquired imaging time range information, and the acquired first tint information.

In order to achieve the object, a non-transitory computer readable recording medium storing an imaging program of the present disclosure causes a computer to execute a process comprising, in a case where a subject is imaged, outputting imaging position information representing an imaging position in which the subject is imaged, imaging time range information representing an imaging time range in which the imaging is performed, and first tint information related to the imaging, in a case where the subject is to be imaged, outputting specific positional information representing a specific position in which imaging is to be performed, and specific time range information representing a specific time range in which the imaging is to be performed, acquiring second tint information which is derived by an information processing apparatus from information obtained by performing statistical processing on the imaging position information, the imaging time range information, and the first tint information and which is recommended in a case of performing the imaging in the specific position and the specific imaging time range, and performing the imaging by an imaging portion using the acquired second tint information.

An information processing apparatus of the present disclosure comprises a processor configured to include acquiring imaging position information representing an imaging position in which imaging is performed, imaging time range information representing an imaging time range in which the imaging is performed, and first tint information related to the imaging, from each of a plurality of imaging apparatuses, and deriving second tint information recommended in a case of performing the imaging in a specific position and a specific time range from information obtained by performing statistical processing on the acquired imaging position information, the acquired imaging time range information, and the acquired first tint information.

An imaging apparatus of the present disclosure comprises a processor configured to include, in a case where a subject is imaged, outputting imaging position information representing an imaging position in which the subject is imaged, imaging time range information representing an imaging time range in which the imaging is performed, and first tint information related to the imaging, in a case where the subject is to be imaged, outputting specific positional information representing a specific position in which imaging is to be performed, and specific time range information representing a specific time range in which the imaging is to be performed, acquiring second tint information which is derived by an information processing apparatus from information obtained by performing statistical processing on the imaging position information, the imaging time range information, and the first tint information and which is recommended in a case of performing the imaging in the specific position and the specific imaging time range, and performing the imaging by an imaging portion using the acquired second tint information.

According to the present disclosure, a more appropriate tint can be simply set in imaging.

DESCRIPTION OF THE PREFERRED EMBODIMENTS

Hereinafter, embodiments of the technology of the present disclosure will be described in detail with reference to the drawings.

First Embodiment

Figure 1:
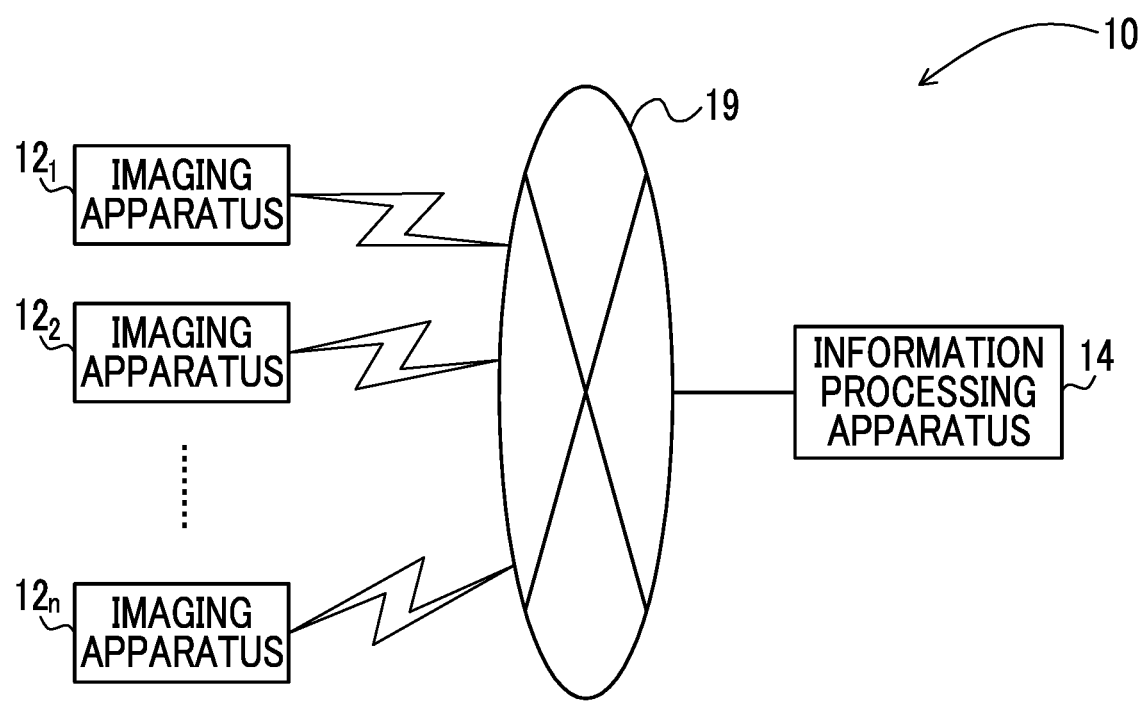
FIG. 1 is a configuration diagram illustrating one example of a configuration of an imaging system of a first embodiment.

First, one example of a configuration of an imaging system 10 of the present embodiment will be described with reference to FIG. 1. For example, as illustrated in FIG. 1, the imaging system 10 of the present embodiment comprises imaging apparatuses $12_1$ to $12_n$ and an information processing apparatus 14. Hereinafter, in a case where the imaging apparatuses $12_1$ to $12_n$ are collectively referred to without distinction therebetween, the imaging apparatuses $12_1$ to $12_n$ will be simply referred to as an "imaging apparatus 12". In a case where the individual imaging apparatuses $12_1$ to $12_n$ are distinguished, the imaging apparatuses $12_1$ to $12_n$ will be referred to with reference signs 1 to n denoting the individual imaging apparatuses $12_1$ to $12_n$.

The imaging apparatus 12 and the information processing apparatus 14 are communicably connected through a network 19.

Figure 2:
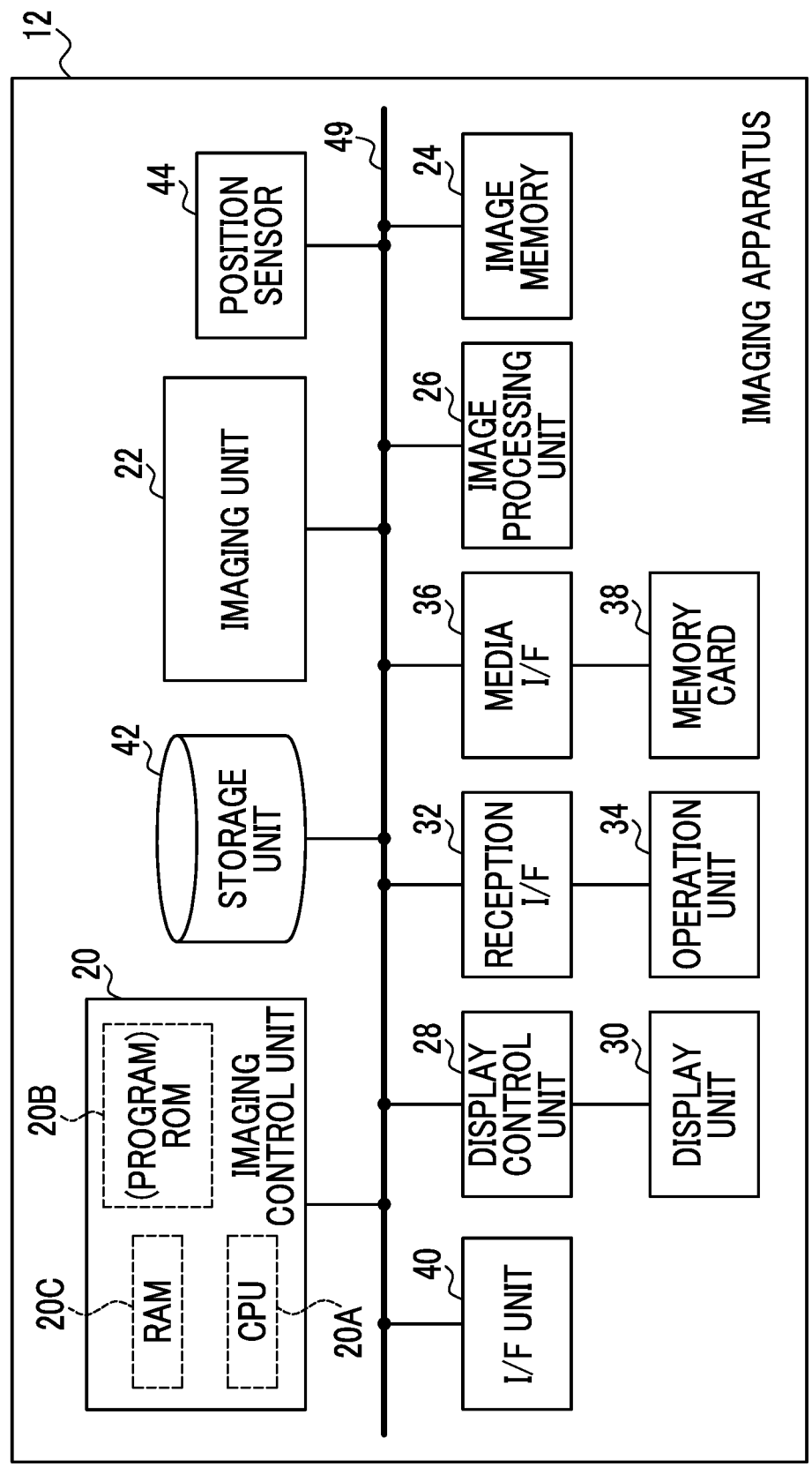
FIG. 2 is a block diagram illustrating one example of a configuration of an imaging apparatus of the first embodiment.

The imaging apparatus 12 of the present embodiment is a so-called digital camera. In the present embodiment, for example, the imaging apparatus 12 has a plurality of functions such as a function of adjusting a white balance, an auto exposure (AE) function, and an auto focus (AF) function. FIG. 2 illustrates a block diagram representing one example of a configuration of the imaging apparatus 12 of the present embodiment. As illustrated in FIG. 2, the imaging apparatus 12 of the present embodiment comprises an imaging control unit 20, an imaging portion 22, an image memory 24, an image processing unit 26, a display control unit 28, a display unit 30, a reception interface (I/F) 32, an operation unit 34, a media I/F 36, a memory card 38, an I/F unit 40, a storage unit 42, and a position sensor 44. The imaging control unit 20, the imaging portion 22, the image memory 24, the image processing unit 26, the display control unit 28, the reception I/F 32, the media I/F 36, the I/F unit 40, the storage unit 42, and the position sensor 44 are connected through a bus 49.

The imaging control unit 20 comprises a central processing unit (CPU) 20A, a read only memory (ROM) 20B, and a random access memory (RAM) 20C. The CPU 20A controls an overall operation of the imaging apparatus 12. The ROM 20B prestores various programs and the like executed by the CPU 20A including a white balance adjustment processing program described later. The RAM 20C temporarily stores various data. The white balance adjustment processing program of the present embodiment is one example of an imaging program according to an embodiment of the technology of the present disclosure. The imaging control unit 20 functions as an output unit and an acquisition unit according to the embodiment of the present disclosure by causing the CPU 20A of the present embodiment to execute the white balance adjustment processing program.

The imaging portion 22 includes an imaging optical system, an imaging element, and the like (none of which is illustrated) and has a function of imaging a subject and generating and outputting an imaged captured image. For example, the imaging optical system of the present embodiment includes an incidence lens, a focus lens, a zoom lens, and a stop. In addition, for example, the imaging element of the present embodiment uses a charge coupled device (CCD) image sensor. Alternatively, the imaging element may use another image sensor such as a complementary metal-oxide-semiconductor (CMOS) image sensor.

Subject light that is reflective light representing the subject is transmitted through the incidence lens, the focus lens, and the zoom lens. The quantity of the subject light is adjusted by the stop, and an image of the subject light is formed on a light receiving surface of the imaging element. In the imaging portion 22, various types of processing such as correlative double sampling processing, automatic gain adjustment processing, and analog/digital (A/D) conversion processing on an image signal of one frame imaged by the imaging element.

The imaging portion 22 outputs the digitized image signal to the image memory 24 one frame at a time at a specific frame rate (for example, a few tens of frames/second) that is defined by a clock signal supplied from the CPU 20A of the imaging control unit 20.

The image memory 24 temporarily stores the image signal input from the imaging portion 22.

The image processing unit 26 acquires the image signal from the image memory 24 one frame at a time at the specific frame rate and performs various types of processing such as gamma-correction processing, brightness conversion processing, color difference conversion processing, and compression processing on the acquired image signal. In addition, the image processing unit 26 outputs the image signal obtained by performing various types of processing to the display control unit 28 one frame at a time at the specific frame rate. Furthermore, the image processing unit 26 outputs the image signal obtained by performing various types of processing to the CPU 20A in response to a request from the CPU 20A.

The display control unit 28 is connected to the display unit 30 and controls the display unit 30 under control of the CPU 20A. In addition, the display control unit 28 outputs the image signal input from the image processing unit 26 to the display unit 30 one frame at a time at the specific frame rate.

The display unit 30 displays an image represented by the image signal input from the display control unit 28 at the specific frame rate as a live view image. The live view image is also referred to as a live preview image and is a consecutive frame image obtained by imaging the subject in consecutive frames by the imaging element of the imaging portion 22. The "captured image" also includes the live view image. In addition to the live view image, a playback image, a menu screen, and the like are also displayed on the display unit 30. For example, the display unit 30 is a liquid crystal display (LCD).

The operation unit 34 includes various buttons including a release button (not illustrated) disposed in a main body of the imaging apparatus 12 and a dial and the like (none of which is illustrated). In addition, the operation unit 34 of the present embodiment includes a touch panel display (not illustrated) that is integrated with the display unit 30. The operation unit 34 receives various instructions from a user.

The operation unit 34 is connected to the reception I/F 32 and outputs an instruction content signal indicating a content of a received instruction to the reception I/F 32. The reception I/F 32 outputs the input instruction content signal to the CPU 20A. The CPU 20A executes processing corresponding to the instruction content signal input from the reception I/F 32.

The memory card 38 is attachably and detachably connected to the media I/F 36. The media I/F 36 records and reads out an image file on the memory card 38 under control of the CPU 20A.

The image file read out from the memory card 38 by the media I/F 36 is subjected to expansion processing by the image processing unit 26 and is displayed as a playback image on the display unit 30 under control of the CPU 20A.

The I/F unit 40 has a function of communicating with the information processing apparatus 14 through the network 19.

The storage unit 42 is a non-volatile storage unit and is, for example, an electrically erasable programmable read-only memory (EEPROM) or a flash memory.

The position sensor 44 has a function of detecting the position of the imaging apparatus 12. In the present embodiment, for example, a global positioning system (GPS) sensor is used as the position sensor 44.

The release button of the operation unit 34 can detect a push operation in two stages of an imaging preparation instruction state and an imaging instruction state. For example, the imaging preparation instruction state refers to a state where a push is performed to an intermediate position (half push position) from a standby position (non-push state). The imaging instruction state refers to a state where a push is performed to a final push position (full push position) beyond the intermediate position. Hereinafter, the "state where a push is performed to the half push position from the standby position" will be referred to as a "half push state", and the "state where a push is performed to the full push position from the standby position" will be referred to as a "full push state".

In an AF mode, an imaging condition is adjusted by setting the release button to the half push state. Then, in a case where the full push state is subsequently set, main exposure of one frame is performed by the imaging element of the imaging portion 22. That is, by setting the release button to the half push state, the AE function is operated, and an exposure amount state is set. Then, the AF function is operated, and focus control is performed. In a case where the release button is set to the full push state, imaging is performed by the imaging element. In addition, the function of adjusting the white balance is operated, and the white balance of the captured image is adjusted by changing a corresponding gain value for each specific color based on the color temperature of the subject or the like.

In addition, the image processing unit 26 performs so-called RAW development by performing the compression processing on the image signal (RAW data) of the captured image and generates an image file in a specific format. For example, the specific format may be a Joint Photographic Experts Group (JPEG) format. The generated image file is recorded on the memory card 38 by the image processing unit 26 through the media I/F 36.

Figure 3:
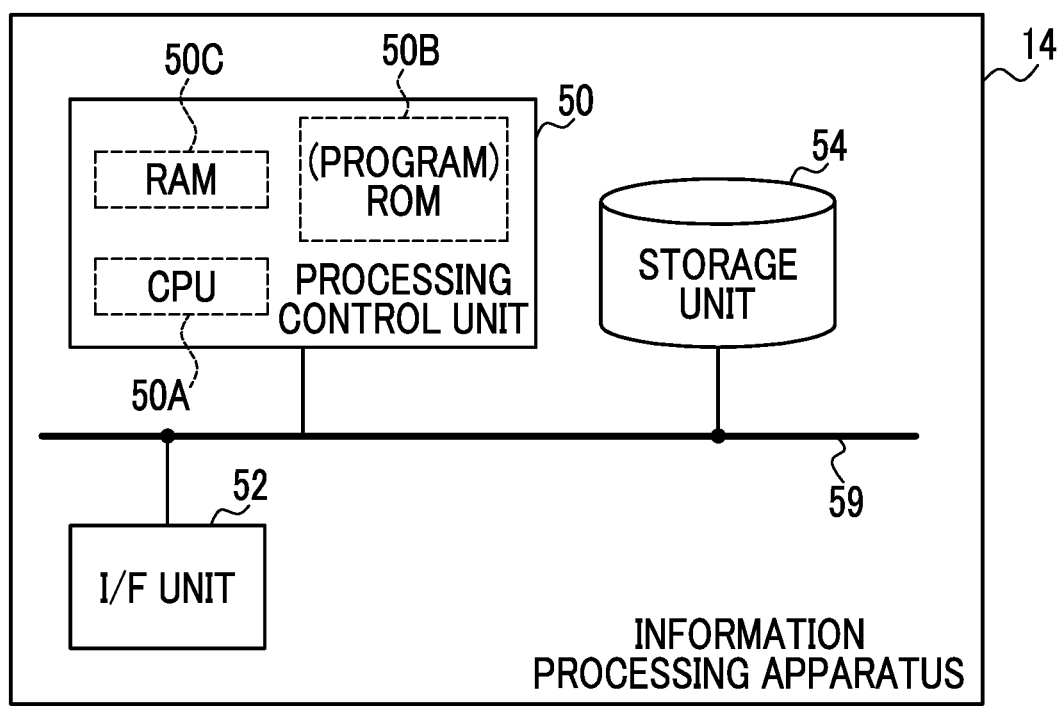
FIG. 3 is a block diagram illustrating one example of a configuration of an information processing apparatus of the first embodiment.

The information processing apparatus 14 is a so-called server computer or the like. FIG. 3 illustrates a block diagram representing one example of a configuration of the information processing apparatus 14 of the present embodiment. As illustrated in FIG. 3, the information processing apparatus 14 of the present embodiment comprises a processing control unit 50, an I/F unit 52, and a storage unit 54. The processing control unit 50, the I/F unit 52, and the storage unit 54 are connected to a bus 59.

The processing control unit 50 comprises a CPU 50A, a ROM 50B, and a RAM 50C. The CPU 50A controls an overall operation of the information processing apparatus 14. The ROM 50B prestores various programs and the like executed by the CPU 50A including a recommended color temperature derivation processing program described later. The RAM 50C temporarily stores various data. The recommended color temperature derivation processing program of the present embodiment is one example of an information processing program according to the embodiment of the present disclosure. The processing control unit 50 functions as an acquisition unit and and a derivation unit according to the embodiment of the present disclosure by causing the CPU 50A of the present embodiment to execute the recommended color temperature derivation processing program.

The I/F unit 52 has a function of communicating with the imaging apparatus 12 through the network 19.

The storage unit 54 is a non-volatile storage unit storing positional information, time range information, color temperature information, and the like, described in detail later, and is, for example, a hard disk drive (HDD) or a solid state drive (SSD).

Next, an effect of the imaging system 10 of the present embodiment will be described.

In the imaging system 10 of the present embodiment, the information processing apparatus 14 has a function of deriving a color temperature (hereinafter, referred to as a "recommended color temperature") recommended to be applied to imaging and outputting the color temperature to the imaging apparatus 12 in a case where the imaging apparatus 12 performs imaging. The color temperature of the present embodiment is one example of a tint according to the embodiment of the technology of the present disclosure. The recommended color temperature of the present embodiment is one example of second tint information according to the embodiment of the present disclosure.

The imaging apparatus 12 of the present embodiment includes three modes of an auto white balance (AWB) mode, a color temperature mode, and a recommendation mode as the function of adjusting the white balance. The AWB mode is a mode in which the imaging apparatus 12 adjusts the white balance using the color temperature specified from the captured image. The color temperature mode is a mode in which the white balance is adjusted using the color temperature designated by the user through the operation unit 34. The recommendation mode is a mode in which the imaging apparatus 12 adjusts the white balance based on the recommended color temperature (described in detail later) received from the information processing apparatus 14.

Figure 4:
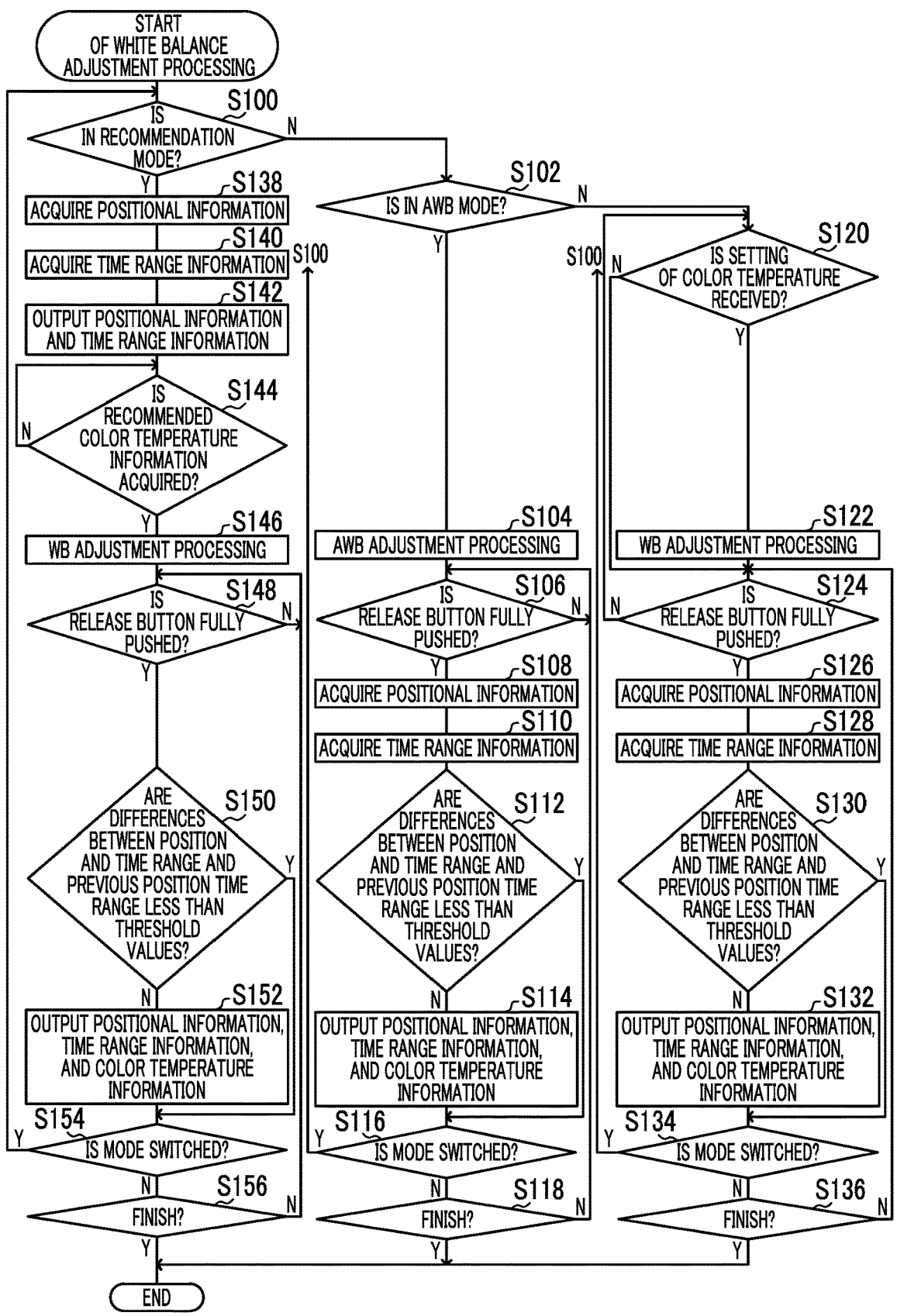
FIG. 4 is a flowchart illustrating one example of a flow of white balance adjustment processing in the imaging apparatus of the first embodiment.

An effect of a case of adjusting the white balance in the imaging apparatus 12 of the present embodiment will be described. FIG. 4 illustrates a flowchart representing one example of a flow of white balance adjustment processing executed in the imaging apparatus 12 of the present embodiment.

In the imaging apparatus 12 of the present embodiment, for example, in a case where the imaging apparatus 12 is powered up, the white balance adjustment processing illustrated in FIG. 4 is executed by causing the CPU 20A of the imaging control unit 20 to execute the white balance adjustment processing program stored in the ROM 20B.

As illustrated in FIG. 4, in step S100, the imaging control unit 20 determines whether or not the mode set for adjusting the white balance is the recommendation mode. In a case where the set mode is not the recommendation mode, in other words, in a case where the AWB mode or the color temperature mode is set, the determination of step S100 results in a negative determination, and a transition is made to step S102.

In step S102, the imaging control unit 20 determines whether or not the set mode is the AWB mode. In a case where the set mode is the AWB mode, the determination of step S102 results in a positive determination, and a transition is made to step S104.

In step S104, the imaging control unit 20 performs processing (AWB adjustment processing) of adjusting the AWB using an AWB function. By executing the processing of the present step, the live view image displayed on the display unit 30 is changed to the image in which the white balance is adjusted.

In subsequent step S106, the imaging control unit 20 determines whether or not the release button of the operation unit 34 is set to the full push state through the half push state. The determination of step S106 results in a negative determination until the release button is set to the full push state. After the AWB adjustment processing is performed in step S104, the color temperature and the like of the subject may change as in a case where an elapsed time until the release button is set to the full push state is long or a case where the position (imaging position) of the imaging apparatus 12 is moved. Thus, it is preferable to perform the AWB adjustment processing of step S104 again at each of predetermined timings until the release button is set to the full push state after the AWB adjustment processing of step S104.

In a case where the release button is set to the full push state, that is, in a case where imaging (main exposure) is performed by the imaging element of the imaging portion 22, the determination of step S106 results in a positive determination, and a transition is made to step S108.

In step S108, the imaging control unit 20 acquires the positional information representing the position (imaging position) of the imaging apparatus 12 from the position sensor 44. In subsequent step S110, the imaging control unit 20 acquires the time range information representing time (imaging time) from a time tracking unit, not illustrated.

In a case where the amount of change in imaging position is small and the amount of change in imaging time is small as in a case where a plurality of captured images are imaged at the same location, a change in color temperature of the subject or the like may be small, and the color temperature may be regarded as not changing. In order to decide whether or not the color temperature is regarded as not changing, a threshold value of each of the amount of change in imaging position and the amount of change in imaging time is set in advance in the imaging apparatus 12 of the present embodiment. In subsequent step S112, the imaging control unit 20 determines whether or not differences between the position represented by the acquired positional information and a time range represented by the time range information and the position represented by the positional information and the time represented by the time range information that are output by executing processing of step S114, described later, in a case where the previous white balance adjustment processing is performed are less than the threshold values. In a case where the white balance adjustment processing is performed for the first time such as after the imaging apparatus 12 is powered up for the first time after purchase of the imaging apparatus 12, the processing of the present step can be omitted.

In a case where the differences in both of the position and the time range are not less than the threshold values, in other words, in a case where at least one of the difference between the positions or the difference between the time ranges is greater than or equal to the threshold value, the determination of step S112 results in a negative determination, and a transition is made to step S114. In step S114, the imaging control unit 20 outputs the positional information acquired in step S108, the time range information acquired in step S110, and the color temperature information representing the color temperature used in the AWB adjustment processing of step S104 to the information processing apparatus 14. The positional information output in the present step (S114) is one example of first imaging position information according to the embodiment of the present disclosure. The time range information is one example of first imaging time range information according to the embodiment of the present disclosure. The color temperature information is one example of first tint information according to the embodiment of the present disclosure.

In a case where the difference in each of the position and the time range is less than the threshold value, the determination of step S112 results in a positive determination, and a transition is made to step S116. Accordingly, in the imaging apparatus 12 of the present embodiment, in a case where the color temperature is regarded as not changing, the positional information, the time range information, and the color temperature information are not output to the information processing apparatus 14. In the imaging apparatus 12 of the present embodiment, power consumption is reduced by reducing the frequency of output of these information.

In step S116, the imaging control unit 20 determines whether or not the mode set for adjusting the white balance is switched. In a case where the user switches from the AWB mode to any of the recommendation mode and the color temperature mode through the operation unit 34, the determination of step S116 results in a positive determination, and a return is made to step S100. In a case where the set mode is not switched from the AWB mode, the determination of step S116 results in a negative determination, and a transition is made to step S118.

In step S118, the imaging control unit 20 determines whether or not to finish the present white balance adjustment processing. In the present embodiment, in a case where a power supply is set to an ON state, the determination of step S118 results in a negative determination. A return is made to step S106, and the processing of steps S108 to S116 is repeated. In a case where the power supply is set to an OFF state, the determination of step S118 results in a positive determination, and the present white balance adjustment processing is finished.

In the imaging apparatus 12 of the present embodiment, in the case of the AWB mode, the color temperature information representing the color temperature used in a case of performing the AWB adjustment processing by the AWB function, the positional information representing the imaging position, and the time range information representing the imaging time are output to the information processing apparatus 14.

In a case where the set mode is not the AWB mode, in other words, in a case where the set mode is the color temperature mode, the determination of step S102 results in a negative determination, and a transition is made to step S120.

In step S120, the imaging control unit 20 determines whether or not a setting of the color temperature is received through the operation unit 34 and the reception I/F 32. In a case where the setting of the color temperature is not received, the determination of step S120 results in a negative determination, and a transition is made to step S124. In a case where the setting of the color temperature designated by the user is received, the determination of step S120 results in a positive determination, and a transition is made to step S122. In step S122, the imaging control unit 20 performs the white balance (WB) adjustment processing of adjusting the white balance using the received color temperature. By executing the processing of the present step, the live view image displayed on the display unit 30 is changed to the image in which the white balance is adjusted depending on the color temperature designated by the user.

In subsequent step S124, in the same manner as step S106, the imaging control unit 20 determines whether or not the release button of the operation unit 34 is set to the full push state. In a case where the release button is not set to the full push state, the determination of step S124 results in a negative determination, and a return is made to step S120. In a case where the release button is set to the full push state, the determination of step S124 results in a positive determination, and a transition is made to step S126.

In the processing of steps S126 to S136, the same processing as the processing of steps S108 to S118 is performed. Accordingly, in the imaging apparatus 12 of the present embodiment, in the case of the color temperature mode, the color temperature information representing the color temperature designated by the user, the positional information representing the imaging position, and the time range information representing the imaging time are output to the information processing apparatus 14.

In a case where the set mode is the recommendation mode, the determination of step S100 results in a positive determination, and a transition is made to step S138.

In step S138, the imaging control unit 20 acquires the positional information representing the position (imaging position) of the imaging apparatus 12 from the position sensor 44. In subsequent step S140, the imaging control unit 20 acquires the time range information representing time (imaging time) from the time tracking unit, not illustrated. In subsequent step S142, the imaging control unit 20 outputs the positional information acquired in step S138 and the time range information acquired in step S140 to the information processing apparatus 14. The positional information output in the present step is one example of second imaging position information according to the embodiment of the present disclosure. The time range information is one example of second imaging time range information according to the embodiment of the present disclosure.

In the information processing apparatus 14, while details will be described later, recommended color temperature information that represents the recommended color temperature corresponding to the positional information and the time range information received from the imaging apparatus 12 is transmitted to the imaging apparatus 12. Thus, in subsequent step S144, the imaging control unit 20 determines whether or not the recommended color temperature information is acquired. The determination of step S144 results in a negative determination until the recommended color temperature information is acquired. In a case where the recommended color temperature information is acquired, the determination of step S144 results in a positive determination, and a transition is made to step S146.

In step S146, the imaging control unit 20 performs the WB adjustment processing of adjusting the white balance using the recommended color temperature represented by the recommended color temperature information. By executing the processing of the present step, the live view image displayed on the display unit 30 is changed to the image in which the white balance is adjusted depending on the recommended color temperature.

In subsequent step S148, in the same manner as step S106, the imaging control unit 20 determines whether or not the release button of the operation unit 34 is set to the full push state. The determination of step S148 results in a negative determination until the release button is set to the full push state. In the same manner as step S106, it is preferable to perform the processing of steps S138 to S146 again at each of the predetermined timings until the release button is set to the full push state after the WB adjustment processing of step S146 is performed.

In a case where the release button is set to the full push state, the determination of step S148 results in a positive determination, and a transition is made to step S150. In the processing of steps S150 to S156, the same processing as the processing of steps S112 to S118 is performed.

In the imaging apparatus 12 of the present embodiment, in the case of the recommendation mode, the recommended color temperature corresponding to the imaging position and the imaging time is acquired from the information processing apparatus 14 by outputting the imaging position and the imaging time to the information processing apparatus 14, and the WB adjustment processing is performed using the acquired recommended color temperature. In addition, in the imaging apparatus 12 of the present embodiment, in the case of the recommendation mode, the recommended color temperature information representing the recommended color temperature, the positional information representing the imaging position, and the time range information representing the imaging time are output to the information processing apparatus 14.

Figure 5:
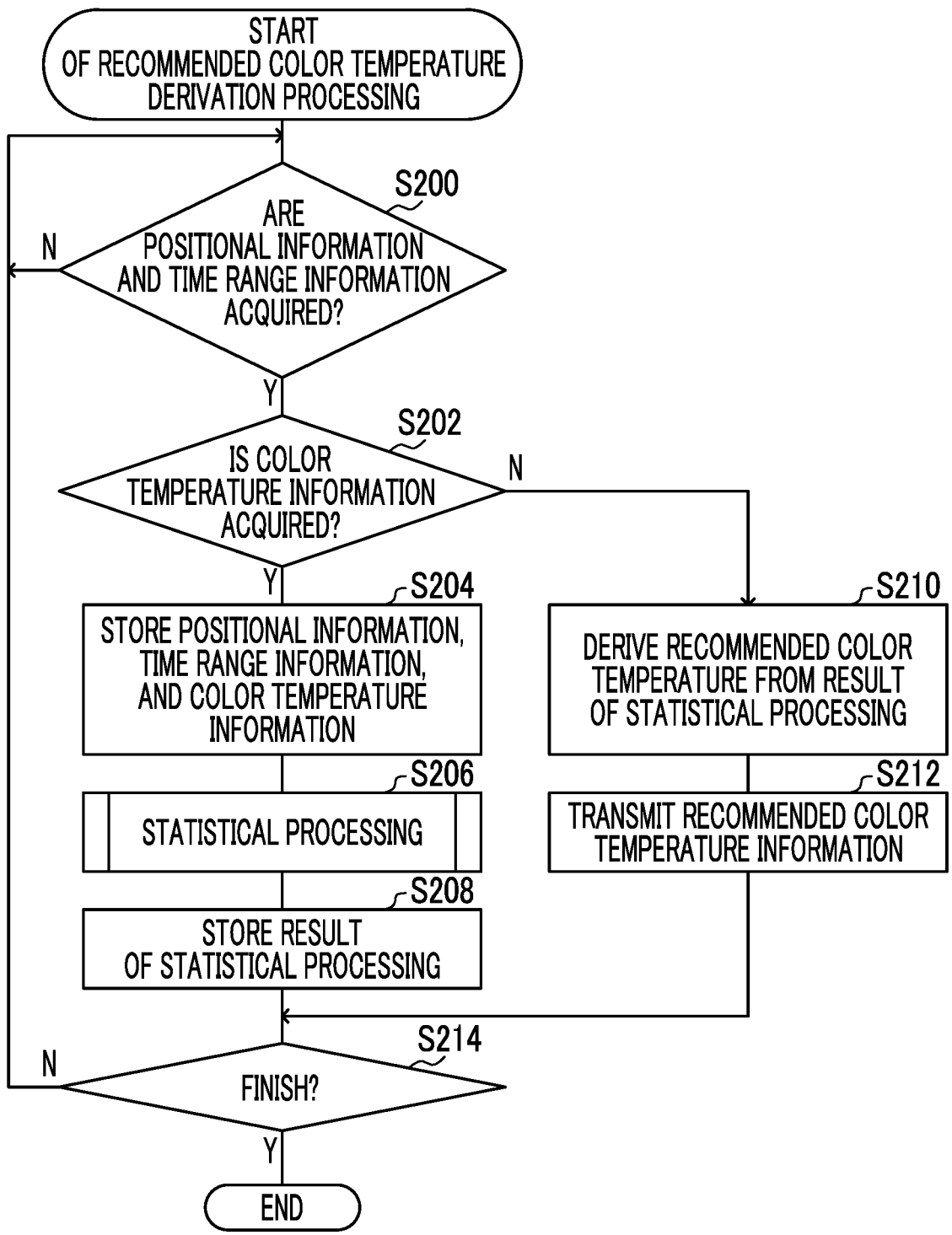
FIG. 5 is a flowchart illustrating one example of a flow of recommended color temperature derivation processing in the information processing apparatus of the first embodiment.

Next, an effect of a case of deriving the recommended color temperature in the information processing apparatus 14 of the present embodiment will be described. FIG. 5 illustrates a flowchart of one example of recommended color temperature derivation processing executed in the information processing apparatus 14 of the present embodiment.

In the information processing apparatus 14 of the present embodiment, for example, in a case where the information processing apparatus 14 is powered up, the recommended color temperature derivation processing illustrated in FIG. 5 is executed by causing the CPU 50A of the processing control unit 50 to execute the recommended color temperature derivation processing program stored in the ROM 50B.

As illustrated in FIG. 5, in step S200, the processing control unit 50 determines whether or not the positional information and the time range information are acquired from the imaging apparatus 12. The determination of step S200 results in a negative determination until the positional information and the time range information are received from the imaging apparatus 12. In a case where the positional information and the time range information are received, the determination of step S200 results in a positive determination, and a transition is made to step S202.

In step S202, the processing control unit 50 determines whether or not the color temperature information is acquired from the imaging apparatus 12. In a case where steps S114, S132, and S152 of the white balance adjustment processing performed by the imaging apparatus 12 are executed, the information processing apparatus 14 receives the positional information, the time range information, and the color temperature information. In this case, the determination of step S202 results in a positive determination, and a transition is made to step S204.

In step S204, the processing control unit 50 stores the positional information, the time range information, and the color temperature information acquired from the imaging apparatus 12 in the storage unit 54 in association with each other. Accordingly, the positional information, the time range information, and the color temperature information output from the imaging apparatus 12 performing imaging are accumulated in a state of association with each other in the storage unit 54 of the information processing apparatus 14 of the present embodiment.

In subsequent step S206, the processing control unit 50 generates information for deriving the recommended color temperature by performing statistical processing on a plurality of pieces of the positional information, the time range information, and the color temperature information stored in the storage unit 54.

Figure 6:
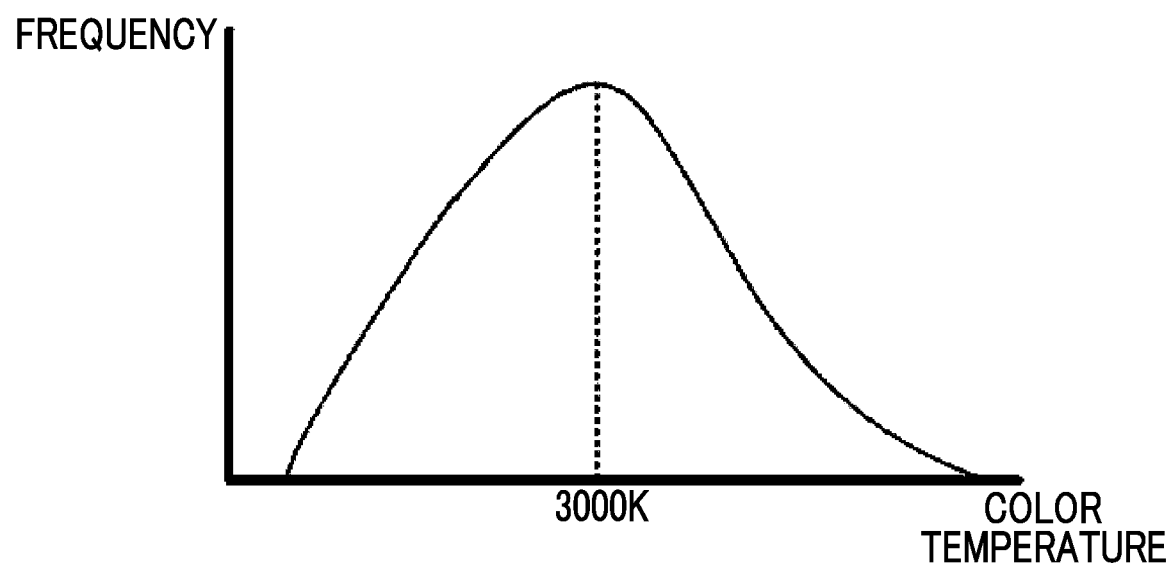
FIG. 6 is a graph illustrating one example of a histogram of a color temperature of the first embodiment.

As one example of the statistical processing, first, for each imaging region and each time range, the processing control unit 50 of the present embodiment generates information representing a histogram in which a horizontal axis denotes the color temperature and a vertical axis denotes the number of times (frequency) of use in imaging as in one example illustrated in FIG. 6. A method of setting the imaging region is not particularly limited. For example, the imaging region may be set depending on a predetermined imaging spot or a landmark or may be set as a region that is divided for each predetermined area.

Specifically, the processing control unit 50 specifies the corresponding imaging region from the imaging position represented by the acquired positional information and adds a frequency corresponding to the acquired color temperature information to the histogram of the acquired time range in the specified imaging region. Furthermore, the processing control unit 50 derives the color temperature that is the most frequent value of the histogram. For example, in the histogram illustrated in FIG. 6, the processing control unit 50 derives 3000K as the color temperature. The derived color temperature is not limited to the most frequent value and may be, for example, a color temperature corresponding to a centroid.

In subsequent step S208, as a result of the statistical processing, the processing control unit 50 stores the color temperature information representing the derived color temperature in the storage unit 54 as information representing the recommended color temperature in the corresponding imaging region and time range and then, transitions to step S214.

In a case where step S142 of the white balance adjustment processing performed by the imaging apparatus 12 is executed, the information processing apparatus 14 receives the positional information and the time range information but does not receive the color temperature information. In this case, the determination of step S202 results in a negative determination, and a transition is made to step S210.

In step S210, the processing control unit 50 derives the recommended color temperature corresponding to the acquired positional information and time range information from the result of the statistical processing stored in the storage unit 54 by the processing of step S208. Specifically, the processing control unit 50 specifies the corresponding imaging region from the imaging position corresponding to the acquired positional information and reads out the information representing the recommended color temperature, which is the statistical result, in the acquired time range in the specified imaging region from the storage unit 54. For example, in a case where the statistical processing is performed with reference to FIG. 6, 3000K is derived as the recommended color temperature.

In subsequent step S212, the processing control unit 50 transmits the recommended color temperature information representing the recommended color temperature derived in step S210 to the imaging apparatus 12, which is the acquisition source of the positional information and the time range information, and then, transitions to step S214.

In step S214, the processing control unit 50 determines whether or not to finish the recommended color temperature derivation processing. In the present embodiment, in a case where the power supply is set to the ON state, the determination of step S214 results in a negative determination. A return is made to step S200, and the processing of steps S200 to S212 is repeated. In a case where the power supply is set to the OFF state, the determination of step S214 results in a positive determination, and the recommended color temperature derivation processing is finished.

Second Embodiment

Hereinafter, a second embodiment will be described. In the present embodiment, the same configurations and effects as the configurations and effects described in the first embodiment will be designated by the same reference signs, and detailed descriptions of such configurations and effects will not be repeated.

A configuration of the imaging system 10 of the present embodiment is the same as the imaging system 10 (refer to FIG. 1) of the first embodiment. Thus, a description of the configuration of the imaging system 10 will not be repeated. In addition, configurations of the imaging apparatus 12 and the information processing apparatus 14 are the same as the configurations of the imaging apparatus 12 and the information processing apparatus 14 (refer to FIG. 2 and FIG. 3) of the first embodiment. Thus, descriptions of the configurations of the imaging apparatus 12 and the information processing apparatus 14 will not be repeated.

In the present embodiment, a part of the white balance adjustment processing executed by the imaging control unit 20 of the imaging apparatus 12 is different from the white balance adjustment processing (refer to FIG. 4) of the first embodiment. Thus, the white balance adjustment processing executed by the imaging control unit 20 of the present embodiment will be described.

Figure 7:
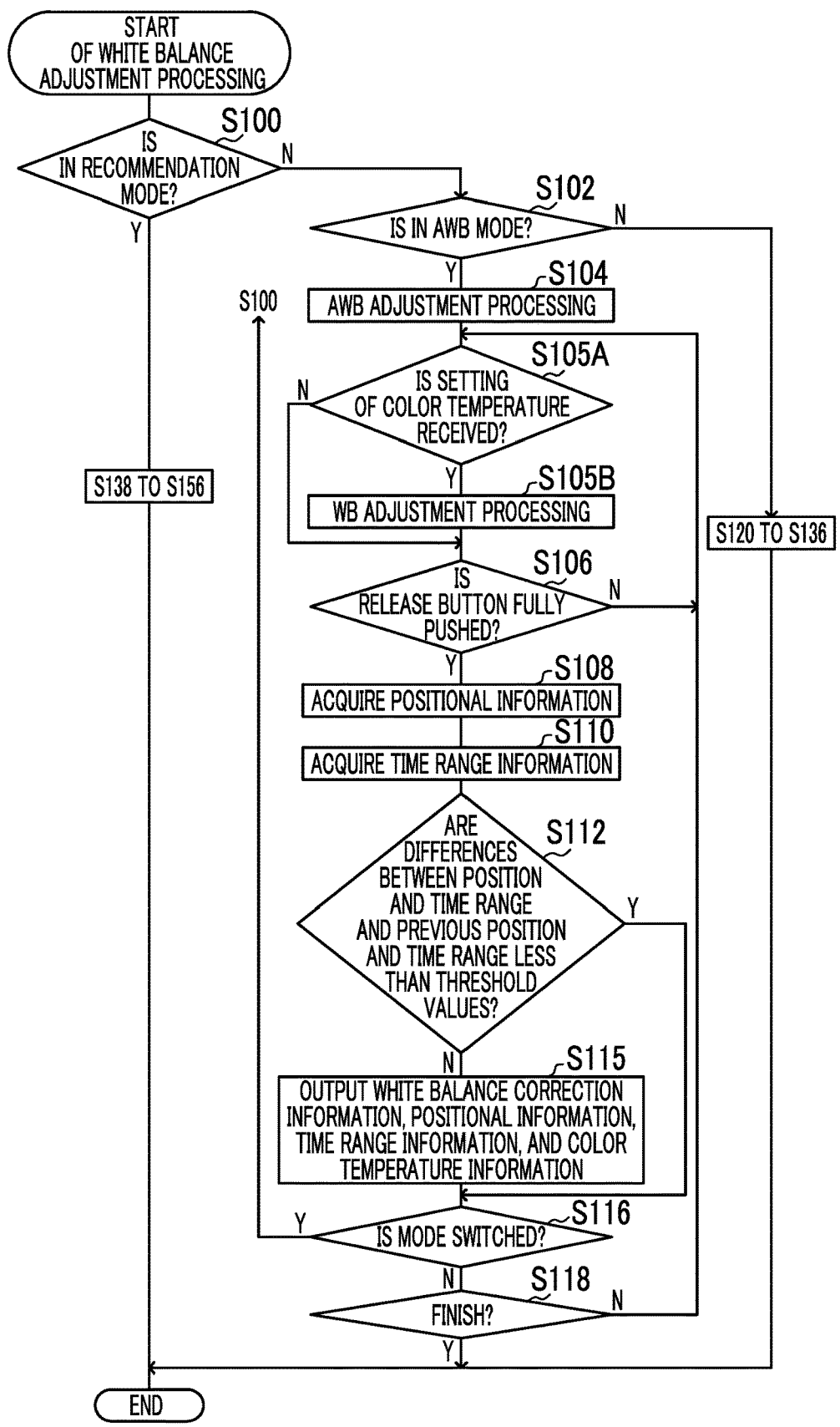
FIG. 7 is a flowchart illustrating one example of a flow of white balance adjustment processing in an imaging apparatus of a second embodiment.

FIG. 7 illustrates a flowchart of one example of a flow of white balance adjustment processing executed by the imaging control unit 20 of the present embodiment. As illustrated in FIG. 7, the white balance adjustment processing of the present embodiment is different from the white balance adjustment processing (refer to FIG. 4) of the first embodiment in that processing of steps S105A and S105B is executed between the processing of steps S104 and S106 and processing of step S115 is executed instead of the processing of step S114.

As illustrated in FIG. 7, in the imaging apparatus 12 of the present embodiment, in a case where the mode for adjusting the white balance is the AWB mode, the imaging control unit 20 in step S105A determines whether or not the setting of the color temperature is received through the operation unit 34 and the reception I/F 32. The user may correct the white balance as in a case where the tint of the captured image in which the white balance is automatically adjusted by the AWB function is not preferred. Therefore, in the present step, a determination as to whether or not the white balance is corrected by the user is performed by determining whether or not the setting of the color temperature is received.

In a case where the setting of the color temperature is not received, the determination of step S105A results in a negative determination, and a transition is made to step S106. In a case where the setting of the color temperature is received, the determination of step S105A results in a positive determination, and a transition is made to step S105B. In step S105B, the imaging control unit 20 adjusts the white balance by performing the WB adjustment processing using the received color temperature. By executing the processing of the present step, the live view image displayed on the display unit 30 is changed to the image in which the white balance is adjusted depending on the color temperature designated by the user.

In addition, as illustrated in FIG. 7, in step S115, the imaging control unit 20 outputs information (hereinafter, referred to as "white balance correction information) representing whether or not the white balance is corrected, the positional information acquired in step S108, the time range information acquired in step S110, and the color temperature information representing the color temperature used in the WB adjustment processing of step S105B to the information processing apparatus 14.

Figure 8:
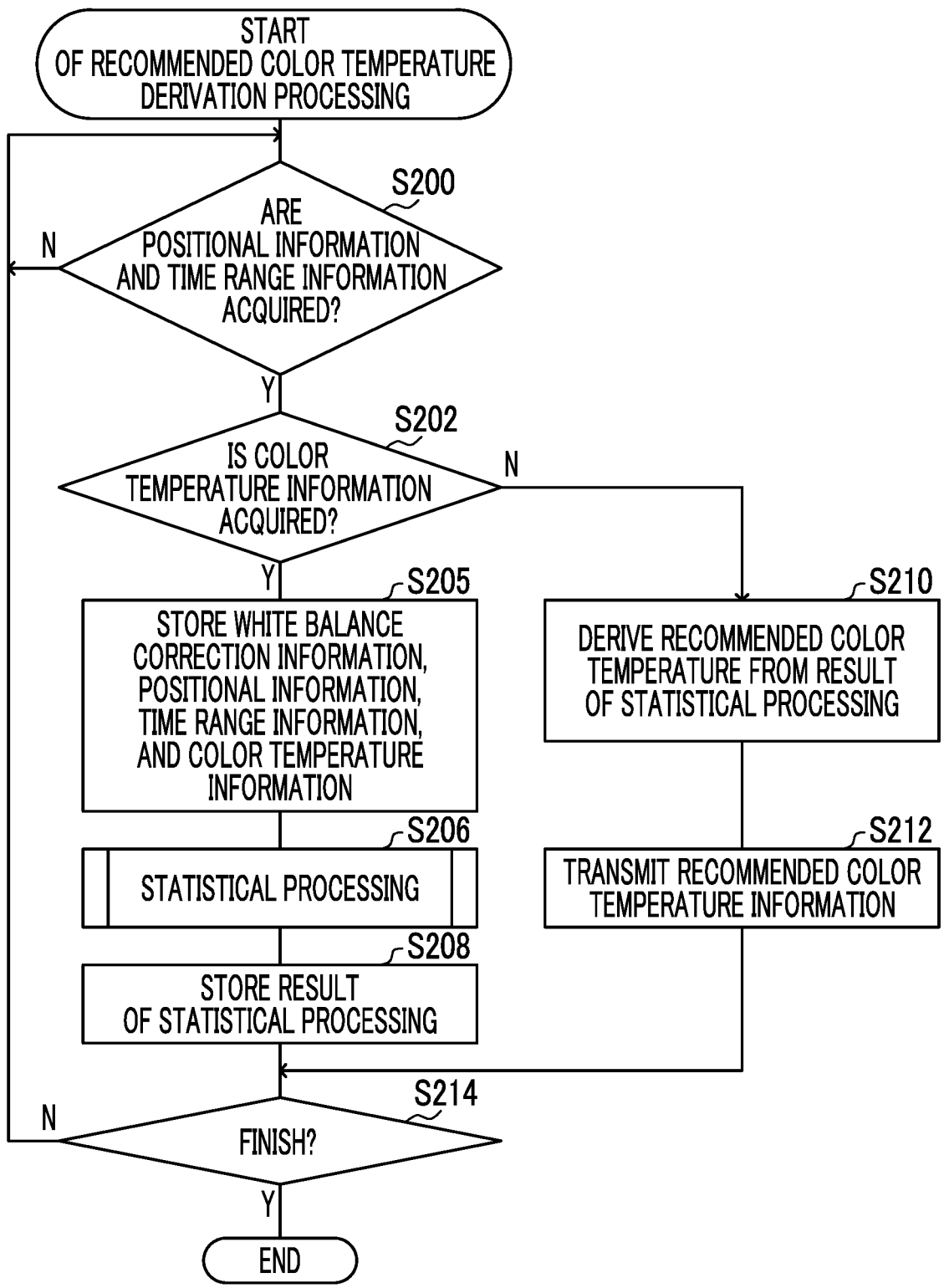
FIG. 8 is a flowchart illustrating one example of a flow of recommended color temperature derivation processing in an information processing apparatus of the second embodiment.

In the information processing apparatus 14, the recommended color temperature derivation processing illustrated in FIG. 8 is executed. FIG. 8 illustrates a flowchart of one example of a flow of recommended color temperature derivation processing executed by the imaging control unit 20 of the present embodiment. As illustrated in FIG. 8, the recommended color temperature derivation processing of the present embodiment is different from the recommended color temperature derivation processing (refer to FIG. 5) of the first embodiment in that processing of step S205 is executed instead of the processing of step S204.

As described above, the white balance correction information, the positional information, the time range information, and the color temperature information are output to the information processing apparatus 14 from the imaging apparatus 12. Thus, the information processing apparatus 14 receives these information.

Therefore, as illustrated in FIG. 8, in step S205, the processing control unit 50 of the information processing apparatus 14 of the present embodiment stores the white balance correction information, the positional information, the time range information, and the color temperature information in the storage unit 54.

Furthermore, in the present embodiment, in subsequent step S206, the processing control unit 50 refers to the white balance correction information in the statistical processing for deriving the recommended color temperature. In a case where the white balance is corrected, the color temperature corresponding to the white balance after correction is a more appropriate color temperature and is generally a color temperature more appropriate than at least the color temperature before correction. Thus, the processing control unit 50 of the present embodiment performs the statistical processing by increasing a weight of the color temperature information for which the white balance correction information indicates that the white balance is corrected, to be higher than another color temperature information (for example, the color temperature information before correction of the white balance).

In the information processing apparatus 14 of the present embodiment, in a case where the white balance is corrected by the user, a color temperature having higher accuracy can be derived as the recommended color temperature by increasing a weight of tint information corresponding to the white balance after correction.

Figure 9:
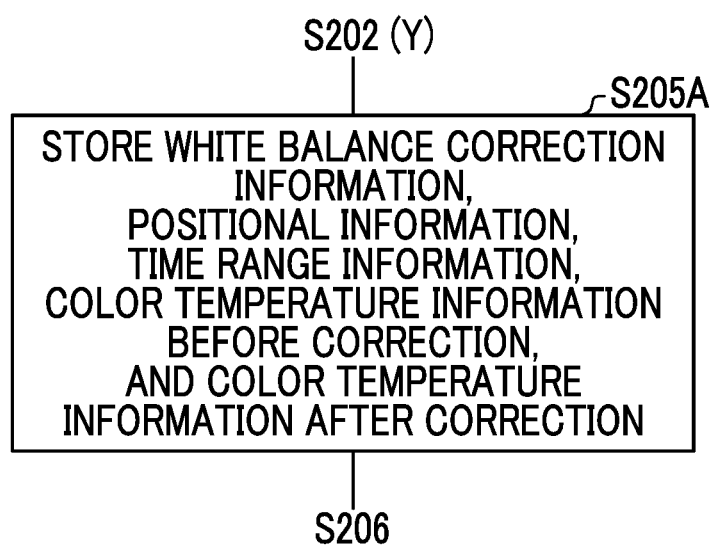
FIG. 9 is a flowchart illustrating another example of the flow of recommended color temperature derivation processing in the information processing apparatus of the second embodiment.

In a case where the white balance is corrected by the user, the imaging apparatus 12 may output color information of both of the color temperature information before correction of the white balance and the color temperature information after correction of the white balance to the information processing apparatus 14. In this case, as illustrated in FIG. 9, the processing control unit 50 of the information processing apparatus 14 executes step S205A instead of step S205 of the recommended color temperature derivation processing and stores the white balance correction information, the positional information, the time range information, the color temperature information before correction of the white balance, and the color temperature information after correction of the white balance in the storage unit 54.

Furthermore, in subsequent step S206, in the statistical processing for deriving the recommended color temperature, the processing control unit 50 can derive a color temperature having higher accuracy as the recommended color temperature by performing the statistical processing by increasing the weight of the color temperature information after correction of the white balance to be higher than at least the color temperature information before correction of the white balance. In addition, a color temperature having further high accuracy can be derived as the recommended color temperature by performing the statistical processing by further decreasing the weight of the color temperature information before correction of the white balance to be lower than the weight of the other color temperature information.

In the present embodiment, an aspect in which the user corrects the white balance in the image in which the white balance is automatically adjusted by the AWB function has been described. However, a target image in which the user corrects the white balance is not particularly limited. For example, the present embodiment may be applied to a case where the user corrects the white balance in the image in which the white balance is adjusted based on the recommended color temperature.

Third Embodiment

Hereinafter, a third embodiment will be described. In the present embodiment, the same configurations and effects as the configurations and effects described in the first embodiment will be designated by the same reference signs, and detailed descriptions of such configurations and effects will not be repeated.

A configuration of the imaging system 10 of the present embodiment is the same as the imaging system 10 (refer to FIG. 1) of the first embodiment. Thus, a description of the configuration of the imaging system 10 will not be repeated. In addition, configurations of the imaging apparatus 12 and the information processing apparatus 14 are the same as the configurations of the imaging apparatus 12 and the information processing apparatus 14 (refer to FIG. 2 and FIG. 3) of the first embodiment. Thus, descriptions of the configurations of the imaging apparatus 12 and the information processing apparatus 14 will not be repeated.

In the second embodiment, an aspect in which the user corrects the white balance has been described. Meanwhile, in the present embodiment, an aspect in which the information processing apparatus 14 monitors the imaging apparatus 12 and further derives the recommended color temperature in a case where imaging is performed in at least one of the imaging position or the time range in which the amount of correction of the white balance by the user is large will be described.

In the present embodiment, a part of the white balance adjustment processing executed by the imaging control unit 20 of the imaging apparatus 12 is different from the white balance adjustment processing (refer to FIG. 7) of the second embodiment. Thus, the white balance adjustment processing executed by the imaging control unit 20 of the present embodiment will be described.

Figure 10:
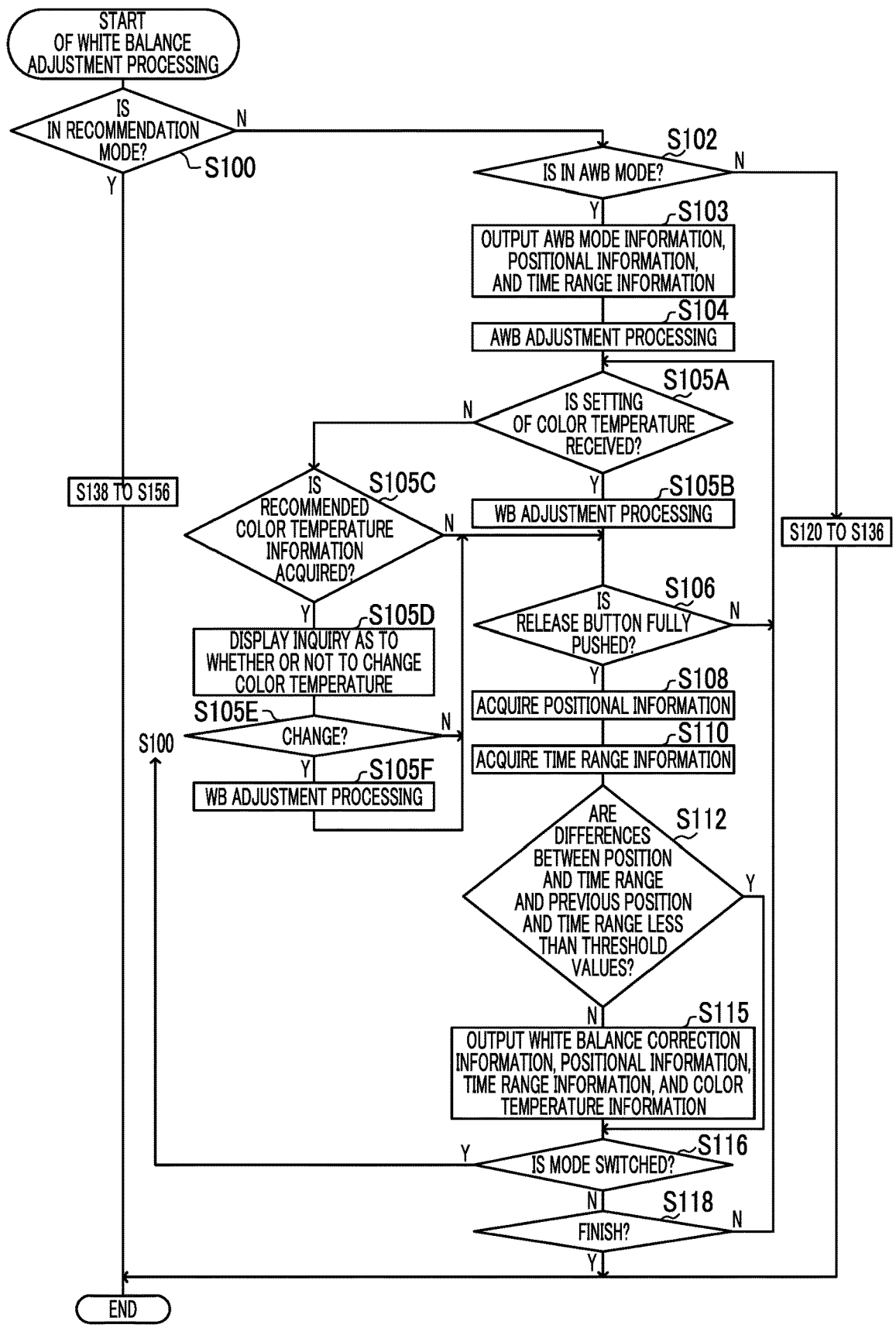
FIG. 10 is a flowchart illustrating one example of a flow of white balance adjustment processing in an imaging apparatus of a third embodiment.

FIG. 10 illustrates a flowchart of one example of a flow of white balance adjustment processing executed by the imaging control unit 20 of the present embodiment. As illustrated in FIG. 10, the white balance adjustment processing of the present embodiment is different in that processing of step S103 is executed in a case where step S102 of the white balance adjustment processing (refer to FIG. 7) of the second embodiment results in a positive determination, and processing of steps S105C to S105F is executed in a case where step S105A results in a negative determination.

In the present embodiment, as illustrated in FIG. 10, a transition is made to step S103 in a case where step S102 results in a positive determination. In step S103, the imaging control unit 20 outputs information (hereinafter, referred to as "AWB mode information") representing the AWB mode, the positional information, and the time range information to the information processing apparatus 14.

In addition, in step S105C, the imaging control unit 20 determines whether or not the recommended color temperature information is acquired from the information processing apparatus 14. In a case where the recommended color temperature information is not acquired, the determination of step S105C results in a negative determination, and a transition is made to step S106. In a case where the recommended color temperature information is acquired, the determination of step S105C results in a positive determination, and a transition is made to step S105D. In step S105D, the imaging control unit 20 displays information for inquiring whether or not to change the color temperature (whether or not to adjust the white balance again) on the display unit 30. The user refers to the display of the display unit 30 and designates whether or not to change the color temperature through the operation unit 34.

Therefore, in subsequent step S105E, the imaging control unit 20 determines whether or not a designation of the change is received. In a case where the designation of the change is not received, the determination of step S105E results in a negative determination, and a transition is made to step S106. In a case where the designation of the change is received, the determination of step S105E results in a positive determination, and a transition is made to step S105F.

In step S105F, the imaging control unit 20 performs the WB adjustment processing of adjusting the white balance using the recommended color temperature represented by the recommended color temperature information. By executing the processing of the present step, the live view image displayed on the display unit 30 is changed to the image in which the white balance is adjusted depending on the recommended color temperature.

Figure 11:
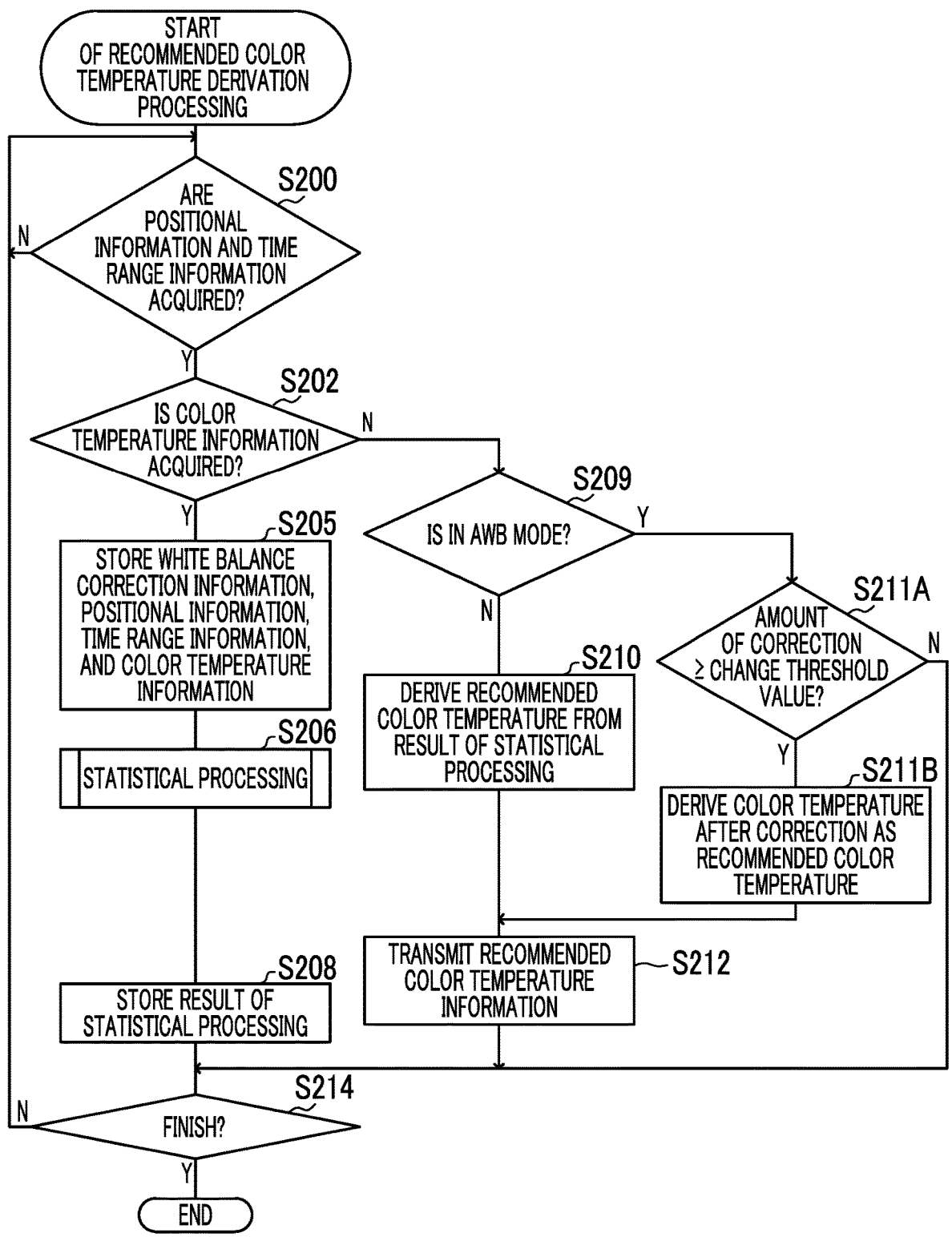
FIG. 11 is a flowchart illustrating one example of a flow of recommended color temperature derivation processing in an information processing apparatus of the third embodiment.

In the information processing apparatus 14, the recommended color temperature derivation processing illustrated in FIG. 11 is executed. FIG. 11 illustrates a flowchart of one example of a flow of recommended color temperature derivation processing executed by the imaging control unit 20 of the present embodiment. As illustrated in FIG. 11, the recommended color temperature derivation processing of the present embodiment is different from the recommended color temperature derivation processing (refer to FIG. 8) of the second embodiment in that processing of step S209 is executed in a case where step S202 results in a negative determination, and processing of steps S211A and S211B is included.

As illustrated in FIG. 11, in a case where step S202 results in a negative determination, the processing control unit 50 of the information processing apparatus 14 of the present embodiment transitions to step S209. In step S209, the processing control unit 50 determines whether or not the imaging apparatus 12 being monitored is in the AWB mode. In a case where the AWB mode information output from the imaging apparatus 12 is not received, the determination of step S209 results in a negative determination, and a transition is made to step S210. In a case where the AWB mode information is received, the determination of step S209 results in a positive determination, and a transition is made to step S211A.

Figure 12:
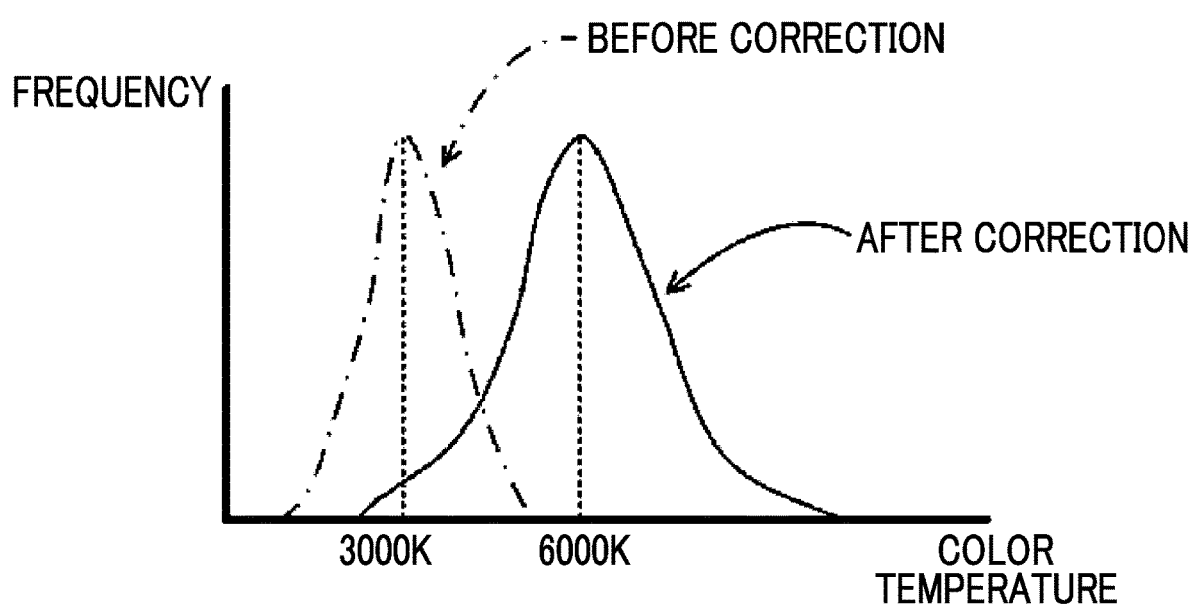
FIG. 12 is a graph illustrating one example of a histogram of a color temperature of the third embodiment.

In step S211A, the processing control unit 50 determines whether or not the amount of correction of the white balance is large in the imaging position represented by the positional information received from the imaging apparatus 12 and the time range represented by the time range information. For example, as in the histogram illustrated in FIG. 12, the recommended color temperature (in FIG. 12, 3000K) derived from the histogram obtained based on the color temperature before correction of the white balance is different from the recommended color temperature (in FIG. 12, 6000K) derived from the histogram obtained based on the color temperature after correction of the white balance by the user. In a case where a difference between the recommended color temperatures obtained before and after correction, that is, the amount of correction (in the case illustrated in FIG. 12, 3000K), is relatively large, it is not preferable to adjust the white balance by the AWB function in imaging in the imaging position and the imaging time range. Therefore, the information processing apparatus 14 of the present embodiment presents the recommended color temperature derived from the histogram obtained based on the color temperature after correction of the white balance to the imaging apparatus 12. For which magnitude of the amount of correction adjusting the white balance by the AWB function is not preferable can obtained in advance by experiment or the like, and a threshold value (change threshold value) can be set.

Thus, in step S211A, the processing control unit 50 determines whether or not the amount of correction is greater than or equal to the change threshold value. In a case where the amount of correction is not greater than or equal to the change threshold value, in other words, in a case where the amount of correction is less than the change threshold value, the determination of step S211A results in a negative determination, and a transition is made to step S214.

In a case where the amount of correction is greater than or equal to the change threshold value, the determination of step S211A results in a positive determination, and a transition is made to step S211B.

In step S211B, the processing control unit 50 derives the color temperature derived from the histogram obtained based on the color temperature after correction as the recommended color temperature. Accordingly, in this case, in subsequent step S212, the recommended color temperature derived based on the color temperature after correction is transmitted to the imaging apparatus 12.

In the information processing apparatus 14 of the present embodiment, the imaging apparatus 12 is monitored, and the recommended color temperature is transmitted to the imaging apparatus 12 in a case where imaging is performed in at least one of the imaging position or the time range in which the white balance is significantly corrected by the user. Accordingly, an effort of adjusting the white balance again by causing the user to designate the color temperature is not required. Thus, the user of the imaging apparatus 12 can simply obtain a captured image preferred by the user.

The image in which the white balance is adjusted by the AWB adjustment function may be set to be visually comparable with the image in which the white balance is adjusted by applying the recommended color temperature. In this case, the user can obtain a more preferred captured image.

As described above, the processing control unit 50 of the information processing apparatus 14 of each embodiment functions as an acquisition unit that acquires the positional information representing the imaging position in which imaging is performed, the time range information representing the imaging time range in which imaging is performed, and the color temperature information related to imaging from each of the plurality of imaging apparatuses 12. In addition, the processing control unit 50 functions as a derivation unit that derives the recommended color temperature information recommended in the case of performing imaging in a specific position and a specific time range from information obtained by performing the statistical processing on the acquired positional information, time range information, and color temperature information.

Accordingly, according to the information processing apparatus 14 of each embodiment, a more appropriate color temperature in imaging can be simply set for the imaging apparatus 12. According to the information processing apparatus 14, for example, even in a case where the AWB function does not appropriately function or it is difficult for the user to determine the color temperature, an appropriate color temperature can be set. In the imaging apparatus 12, an appropriate color temperature is set, and thus, beautiful color reproduction can be performed.

The imaging apparatus 12 is not limited to each embodiment. For example, by storing the RAW data of the captured image, the imaging apparatus 12 may generate the image in which the white balance is adjusted by performing the RAW development again on the RAW data based on the recommended color temperature acquired from the information processing apparatus 14 after the white balance is adjusted based on the color temperature designated by the user or after the white balance is adjusted by the AWB function. The imaging apparatus 12 may present the image to the user.

In addition, in a case where the user performs imaging a plurality of times using different color temperatures in a specific imaging position within a predetermined time range and adjusts the white balance in the captured images a plurality of times using different color temperatures, an aspect in which a color temperature that is most frequently applied is output to the information processing apparatus 14 from the imaging apparatus 12 may be available.

An aspect in which the information processing apparatus 14 does not derive the recommended color temperature may be available in a case where the number of pieces of color temperature information in each time range in the specified imaging region is small in the case of performing the statistical processing in step S206 of the recommended color temperature derivation processing (refer to FIG. 5 and the like), that is, in a case where the number of samples is small. In addition, the number of samples may be increased by increasing the size of the imaging region or increasing the width of the time range, and then, the information representing the histogram in which the horizontal axis denotes the color temperature and the vertical axis denotes the number of times (frequency) of use in imaging may be generated. Accordingly, the information processing apparatus 14 can reduce a decrease in derivation accuracy of the recommended color temperature caused by performing the statistical processing in a case where the number of samples is small.

Even in the same imaging position and the same time range, for example, resolution of the color temperature varies depending on a model of the imaging apparatus 12. Thus, a preferred recommended color temperature may vary. In such a case, the imaging apparatus 12 may further output information representing the model or the like of the host apparatus in step S152 of the white balance adjustment processing (refer to FIG. 4). For example, the processing control unit 50 of the information processing apparatus 14 can further improve the derivation accuracy of the recommended color temperature by generating the information representing the histogram for each model of the imaging apparatus 12 and deriving the recommended color temperature from the generated histogram in step S206 of the recommended color temperature derivation processing (refer to FIG. 5).

In addition, as in the second and third embodiments, in a case where the white balance is corrected by the user, the information processing apparatus 14 may detect a difference between the color temperature after correction by the user and the recommended color temperature and manage a result obtained by performing the statistical processing on the detected difference as information representing preference of the user along with an identification number of the imaging apparatus 12, an identification number of the user, and the like. In this case, in a case where the recommended color temperature is derived for the imaging apparatus 12 (user) of which the identification number is being managed, the recommended color temperature with which an image more corresponding to the preference of the user can be provided can be derived by deriving the recommended color temperature using the information representing the preference of the user.

The positional information may include not only the position of the imaging apparatus 12 but also the direction (imaging direction) of the imaging apparatus 12.

In each embodiment, the color temperature has been described in detail as one aspect of the tint according to the embodiment of the present disclosure. However, the tint is not limited to the color temperature and may be, for example, a tone.

The white balance adjustment processing and the recommended color temperature derivation processing that are executed by causing the CPU to execute software (program) in the embodiments may be executed by various processors other than the CPU. In this case, the processors are illustrated by a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute specific processing, and the like. In addition, the white balance adjustment processing and the recommended color temperature derivation processing may be executed by one of the various processors or may be executed by a combination of two or more processors of the same type or different types (for example, a plurality of FPGAs and a combination of a CPU and an FPGA). In addition, hardware structures of the various processors are more specifically electric circuits in which circuit elements such as semiconductor elements are combined.

In the embodiments, each of the white balance adjustment processing program and the recommended color temperature derivation processing program has been described as being prestored (installed) in the ROM 20B and the ROM 50B, but is not limited thereto. Each of the white balance adjustment processing program and the recommended color temperature derivation processing program may be provided as a recording on a recording medium such as a compact disk read only memory (CD-ROM), a digital versatile disk read only memory (DVD-ROM), and a universal serial bus (USB) memory. In addition, each of the white balance adjustment processing program and the recommended color temperature derivation processing program may be downloaded from an external apparatus through the network.

EXPLANATION OF REFERENCES

10: imaging system
12: imaging apparatus
14: information processing apparatus
19: network
20: imaging control unit
20A, 50A: CPU
20B, 50B: ROM
20C, 50C: RAM
22: imaging portion
24: image memory
26: image processing unit
28: display control unit
30: display unit
32: reception I/F
34: operation unit
36: media I/F
38: memory card
40, 52: I/F unit
42, 54: storage unit
44: position sensor
49, 59: bus

What is claimed is:

1. An information processing apparatus comprising:
a processor configured to
acquire imaging position information representing an imaging position in which imaging is performed, imaging time range information representing an imaging time range in which the imaging is performed, and first tint information related to the imaging, from each of a plurality of imaging apparatuses; and
derive second tint information recommended in a case of performing imaging in a specific position and a specific time range from information obtained by performing statistical processing on the acquired imaging position information, the acquired imaging time range information, and the acquired first tint information.

2. The information processing apparatus according to claim 1,
wherein the processor acquires tint information after correction of a white balance as the first tint information from the imaging apparatus that corrects the white balance among the plurality of imaging apparatuses, and
performs the statistical processing by increasing a weight of the first tint information which is the tint information after correction of the white balance to be higher than the weight of another first tint information.

3. The information processing apparatus according to claim 2,
wherein an image before correction of the white balance is an image in which the white balance is adjusted based on the second tint information.

4. The information processing apparatus claim 3,
wherein the processor further transmits the second tint information to the imaging apparatuses performing the imaging in the specific position and the specific time range.

5. The information processing apparatus claim 2,
wherein the processor further transmits the second tint information to the imaging apparatuses performing the imaging in the specific position and the specific time range.

6. The information processing apparatus according to claim 2,
wherein the processor further acquires specific positional information representing the specific position and specific time range information representing the specific time range from the imaging apparatuses, and
further transmits the derived second tint information to the imaging apparatuses from which the specific positional information and the specific time range information are acquired.

7. The information processing apparatus according to claim 1,
wherein the processor acquires two types of tint information including tint information before correction of a white balance and tint information after correction of the white balance as the first tint information from the imaging apparatus that comas the white balance among the plurality of imaging apparatuses, and
performs the statistical processing by increasing a weight of the first tint information which is the tint information after correction of the white balance to be higher than the weight of the first tint information which is the tint information before correction of the white balance.

8. The information processing apparatus according to claim 7,
wherein an image before correction of the white balance is an image in which the white balance is adjusted based on the second tint information.

9. The information processing apparatus claim 8,
wherein the processor further transmits the second tint information to the imaging apparatuses performing the imaging in the specific position and the specific time range.

10. The information processing apparatus claim 7,
wherein the processor further transmits the second tint information to the imaging apparatuses performing the imaging in the specific position and the specific time range.

11. The information processing apparatus according to claim 7,
wherein the processor further acquires specific positional information representing the specific position and specific time range information representing the specific time range from the imaging apparatuses, and
further transmits the derived second tint information to the imaging apparatuses from which the specific positional information and the specific time range information are acquired.

12. The information processing apparatus claim 1,
wherein the processor further transmits the second tint information to the imaging apparatuses performing the imaging in the specific position and the specific time range.

13. The information processing apparatus according to claim 1,
wherein the processor further acquires specific positional information representing the specific position and specific time range information representing the specific time range from the imaging apparatuses, and
further transmits the derived second tint information to the imaging apparatuses from which the specific positional information and the specific time range information are acquired.

14. The information processing apparatus according to claim 1,
wherein the statistical processing is processing of deriving information representing a frequency of the first tint information for each imaging position represented by the imaging position information and each imaging time range represented by the imaging time range information.

15. A non-transitory computer readable recording medium storing an information processing program for causing a computer comprised in the information processing apparatus according to claim 1 to execute a process comprising:
acquiring imaging position information representing an imaging position in which imaging is performed, imaging time range information representing an imaging time range in which the imaging is performed, and first tint information related to the imaging, from each of a plurality of imaging apparatuses; and
deriving second tint information recommended in a case of performing the imaging in a specific position and a specific time range from information obtained by performing statistical processing on the acquired imaging position information, the acquired imaging time range information, and the acquired first tint information.

16. An imaging apparatus comprising:
a processor configured to,
in a case where a subject is imaged, output imaging position information representing an imaging position in which the subject is imaged, imaging time range information representing an imaging time range in which the imaging is performed, and first tint information related to the imaging, and in a case where the subject is to be imaged, output specific positional information representing a specific position in which imaging is to be performed, and specific time range information representing a specific time range in which the imaging is to be performed;
acquire second tint information which is derived by an information processing apparatus from information obtained by performing statistical processing on the imaging position information, the imaging time range information, and the first tint information and which is recommended in a case of performing the imaging in the specific position and the specific imaging time range; and
perform the imaging by an imaging portion using the acquired second tint information.

17. An imaging system comprising:
the imaging apparatus according to claim 16; and
the information processing apparatus,
wherein the information processing apparatus comprises:
a processor configured to
acquire the imaging position information, the imaging time range information, and the first tint information, from the imaging apparatus; and
derive the second tint information.

18. An imaging method using the imaging apparatus according to claim 16 comprising:
in a case where a subject is imaged, outputting imaging position information representing an imaging position in which the subject is imaged, imaging time range information representing an imaging time range in which the imaging is performed, and first tint information related to the imaging;
in a case where the subject is to be imaged, outputting specific positional information representing a specific position in which imaging is to be performed, and specific time range information representing a specific time range in which the imaging is to be performed;
acquiring second tint information which is derived by an information processing apparatus from information obtained by performing statistical processing on the imaging position information, the imaging time range information, and the first tint information and which is recommended in a case of performing the imaging in the specific position and the specific imaging time range; and
performing the imaging by an imaging portion using the acquired second tint information.

19. A non-transitory computer readable recording medium storing an imaging program for causing a computer comprised in the imaging apparatus according to claim 16 to execute a process comprising:
in a case where a subject is imaged, outputting imaging position information representing an imaging position in which the subject is imaged, imaging time range information representing an imaging time range in which the imaging is performed, and first tint information related to the imaging;
in a case where the subject is to be imaged, outputting specific positional information representing a specific position in which imaging is to be performed, and specific time range information representing a specific time range in which the imaging is to be performed;

acquiring second tint information which is derived by an information processing apparatus from information obtained by performing statistical processing on the imaging position information, the imaging time range information, and the first tint information and which is recommended in a case of performing the imaging in the specific position and the specific imaging time range; and performing the imaging by an imaging portion using the acquired second tint information.

20. An information processing method comprising:

acquiring imaging position information representing an imaging position in which imaging is performed, imaging time range information representing an imaging time range in which the imaging is performed, and first tint information related to the imaging, from each of a plurality of imaging apparatuses; and deriving second tint information recommended in a case of performing the imaging in a specific position and a specific time range from information obtained by performing statistical processing on the acquired imaging position information, the acquired imaging time range information, and the acquired first tint information.

* * * * *